United States Patent [19]
Kikuchi et al.

[11] 3,833,434
[45] Sept. 3, 1974

[54] METHOD OF FORMING MULTI-LAYER INTERCONNECTIONS

[75] Inventors: Akira Kikuchi; Takashi Agatsuma, both of Tokyo, Japan

[73] Assignee: Hitachi, Ltd., Tokyo, Japan

[22] Filed: Feb. 20, 1973

[21] Appl. No.: 334,073

[52] U.S. Cl............................. 156/8, 156/3, 156/17, 252/79.2, 252/79.3, 252/79.4
[51] Int. Cl. ............................................. C23f 1/02
[58] Field of Search............ 117/212, 217; 156/3, 8, 156/11, 17; 317/234, 235; 29/576, 583; 252/79.3, 79.4, 79.5, 79.2

[56] References Cited
UNITED STATES PATENTS

| | | | |
|---|---|---|---|
| 3,436,327 | 4/1969 | Shockley......................... | 117/212 X |
| 3,699,011 | 10/1972 | Nishimura...................... | 117/212 X |
| 3,700,508 | 10/1972 | Keen................................ | 156/17 X |

*Primary Examiner*—William A. Powell
*Attorney, Agent, or Firm*—Craig & Antonelli

[57] ABSTRACT

A method of forming multi-layer interconnections, wherein a porous metal oxide film overlying a metal layer is side-etched by utilizing the larger etching rate of the metal oxide film compared to that of the metal layer, so as to form an electrode interconnection portion of the metal layer which is etched into a gently sloping shape at the ends of its upper surface and its sides corresponding to the side-etched parts of the porous film. Second and higher-order layers of electrode interconnection portions are successively formed in such a manner that an insulating film is interposed between the electrode interconnection portion with the ends of its upper surface and its sides formed into the gently sloping shape and each layer of electrode interconnection portion to be formed over the former electrode interconnection portion.

10 Claims, 8 Drawing Figures

METHOD OF FORMING MULTI-LAYER INTERCONNECTIONS

BACKGROUND OF THE INVENTION

1. Field of the Invention

The present invention relates to a method of forming multi-layer interconnections, and more particularly to an etching treatment process in the formation of the multi-layer interconnections.

2. Description of the Prior Art

In the field of on-slice LSI's, on-substrate LSI's, etc., as the degree of integration of devices has become high, the necessity for multi-layer interconnections has been created. The construction of a multi-layer interconnection portion being most frequently employed at present is shown in FIG. 1.

With this construction, when the first layer of electrode interconnection portion 1 is formed by chemical etching, sharp corners 1a appear in the etching figure. As a result, when an insulating film 2 of silicon oxide ($SiO_2$), glass or the like is formed on the upper surface of the first layer of electrode interconnection portion 1, it does not possess a uniform thickness, and is formed to be extremely thin in the vicinity of the corners 1a of the electrode interconnection portion 1. Reference numeral 3 designates the second layer of electrode interconnection portion which is formed on the upper surface of the insulating film 2. For the above reason, the first layer of the electrode interconnection portion 1 and the second layer of the electrode interconnection portion 3 are adjacent to each other through the very thin part of the insulating film in the neighborhood of the corner 1a of the first layer of electrode interconnection portion 1. Therefore, when cracks appear in the insulating film at the adjacent part, the problem of short-circuiting the electrode interconnection portions 1 and 3 will disadvantageously arise.

Moreover, at a position at which the second layer of the electrode interconnection portion 3 intersects with the first layer of the electrode interconnection portion 1, the insulating film protrudes abruptly towards the second electrode interconnection layer. Therefore, when the second electrode interconnection portion is formed, it is susceptible to disconnection at the intersecting part due to the shadowing effect of the insulating film, as will be apparent from FIG. 2. This leads to such a disadvantage that reliable multi-layer interconnections are not attainable.

SUMMARY OF THE INVENTION

The present invention has eliminated the aforesaid disadvantages, and has as its object the provision of a method of forming multi-layer interconnections which is constructed such that the lower layer of electrode interconnection portion has its sides formed gently to remove sharp corners, thereby preventing short-circuiting of the lower layer of electrode interconnection portion with the upper layer of electrode interconnection portion and a disconnection of the upper layer of electrode interconnection portion and, accordingly, making the multi-layer interconnections reliable.

PREFERRED EMBODIMENT OF THE INVENTION

An embodiment of the present invention will now be described in the sequence of manufacturing steps for a multi-layer interconnection substrate and with reference to FIGS. 3A to 3F.

Figure 1:
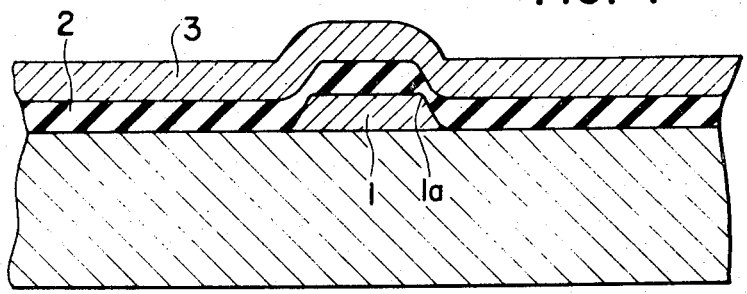
FIG. 1 is a side view, in longitudinal section, showing an interconnection substrate according to the prior-art method of multi-layer interconnections as has already been explained.
Figure 2:
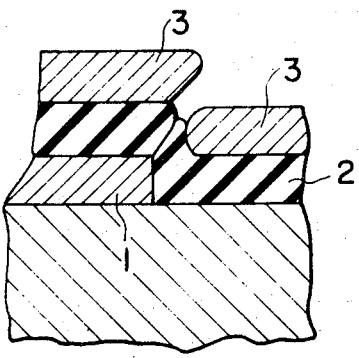
FIG. 2 is a side view, in longitudinal section, showing relevant portions in the case where a disconnection has arisen in the second layer of electrode interconnection portion of the substrate in FIG. 1.
Figure 3A:
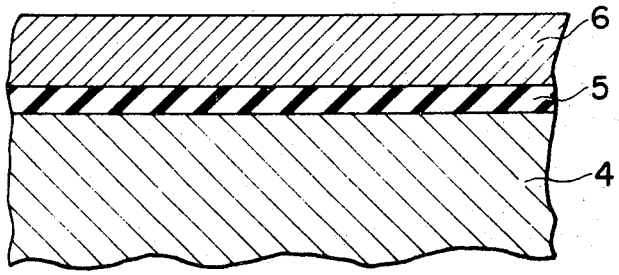
FIGS. 3A to 3F are side views, in longitudinal sections, for explaining various steps for manufacturing an interconnection substrate by a method of multi-layer interconnections according to the present invention, respectively.

First, as shown in FIG. 3A, an aluminum layer 6 to form the first layer of electrode interconnection portion is formed on a protective film 5 of a base 4 by evaporation. The thickness of the aluminum layer 6 is about 1 $\mu$.

Figure 3B:
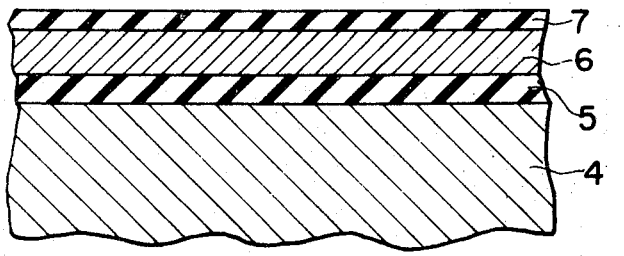

Subsequently, the upper region of the aluminum layer 6 is oxidized by an anodic oxidation process, to form a porous alumina ($Al_2O_3$) film 7 as shown in FIG. 3B. The thickness of the film 7 is approximately 500 A. For the oxidation of aluminum (Al) into porous alumina ($Al_2O_3$), a 5 percent oxalic acid solution is used as the treating liquid of the anodic oxidation process. The formation of the porous alumina film 7 with the anodic oxidation process can be easily performed, and the control of the thickness of the film is easy.

Figure 3C:
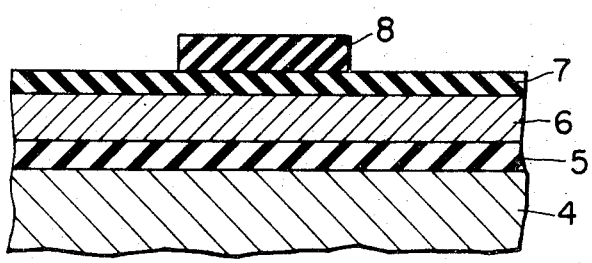

Next, as illustrated in FIG. 3C, a photoresist film 8 is formed on selected areas of the upper surface of the porous alumina film 7.

Using the photoresist film 8 as a mask, the aluminum layer 6 inclusive of the alumina film 7 is subjected to etching treatment with a mixed solution in which phosphoric acid, acetic acid, nitric acid and water are mixed in the proportions of 760 cc, 150 cc, 30 cc and 50 cc, respectively ($H_3PO_4$ - $CH_3COOH$ - $HNO_3$ - $H_2O$ series etching liquid). The amount of $H_3PO_4$ in solution may vary within a range of plus or minus 10 per cent. The temperature of the liquid etchant may vary, theoretically from room temperature to the boiling point of the etchant. Preferably, the temperature range is from 20° to 60°C. and a desirable temperature is 40° C. The etching rates of the liquid etchant for aluminum (Al) and for porous alumina ($Al_2O_3$) are respectively 2,600 – 3,000 A/ min. and 5,000 – 6,000 A/ min. The part 7b of the porous alumina film and the part 6b of the aluminum layer which are not masked by the photoresist film 8 are etched and removed by the etching liquid.

Figure 3D:
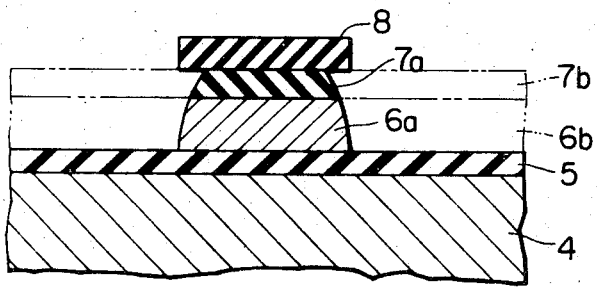

The adhering force of the photoresist film 8 to the porous alumina film 7 is strong. Since, however, the etching rate for the porous alumina film 7 is, as stated above, substantially twice as large as the etching rate for the aluminum layer 6, they are not etched with the same dimensions. As illustrated in FIG. 3D, the part 7a of the porous alumina film between the photoresist film 8 and the part 6a of the aluminum layer is side-etched by the liquid etchant. The aluminum layer 6a with the porous alumina film 7a formed thereon is accordingly exposed to the etching liquid by the side etching of the porous alumina film 7a, so that the part 6a is also etched at ends of the upper surface into a profile of gentle slope.

Figure 3E:
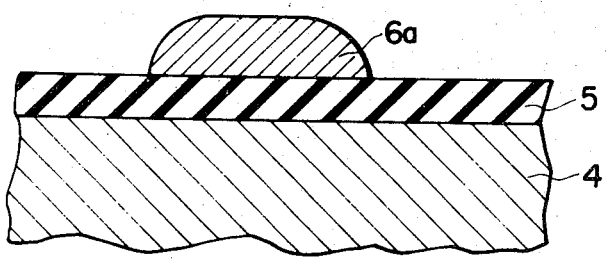

Subsequently, as shown in FIG. 3E, the photoresist film 8 is removed by a well-known photoresist material-removing liquid such as trichloroethylene, benzene and toluene, whereupon the porous alumina film 7a on the alumina layer 6a is removed by a mixed solution consisting of phosphoric acid, chromic acid and water ($H_3PO_4$ - $CrO_3$ - $H_2O$ series etching liquid) or a mixed solution consisting of phosphoric acid, glacial acetic acid, nitric acid and water. The aluminum layer 6a, with the ends of the upper surface formed at the smooth inclination, constitutes the first layer of electrode interconnection portion.

Figure 3F:
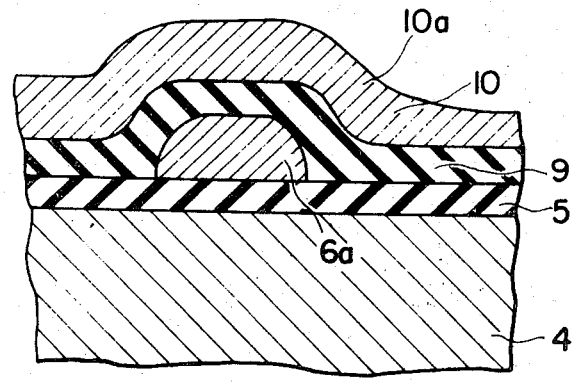

At the next step, as illustrated in FIG. 3F, an insulating film 9 of silicon oxide ($SiO_2$), glass or the like is formed on the first layer of electrode interconnection portion 6a. Thereafter, the second aluminum layer 10 is formed by evaporation, and is etched into the second layer of electrode interconnection portion 10a. Herein, since the first layer of electrode interconnection portion 6a has the ends of its upper surface formed gently, the insulating film 9 is formed on the electrode interconnection portion 6a at a uniform thickness and at a gentle slope. The second layer of electrode interconnection portion 10a is also formed on the insulating film 9 at the gentle slope.

Accordingly, a short-circuit between the first electrode interconnection portion 6a and the second electrode interconnection portion 10a through the insulating film 9 is prevented. Owing to the formation of the first electrode interconnection portion 6a with a gentle slope, the second electrode interconnection portion 10a is prevented from undergoing a disconnection at a position at which it intersects with the first electrode interconnection portion 6a. The connection between the first layer of electrode interconnection portion 6a and the second layer of electrode interconnection portion 10a may be made after through-hole etching at the position of their intersection.

When forming the second layer of electrode interconnection portion 10a and the third and higher-order layers of electrode interconnection portions, if they are side-etched as in the formation of the first layer of electrode interconnection portion 6a, then three, four or more layers of electrode interconnection portions can be formed without any problem of short-circuiting, disconnection, etc., and a reliable multi-layer interconnection substrate can be made.

As described above, in accordance with the multi-layer interconnection method of the present invention, the ends of the upper surface and the sides of the electrode interconnection portion are formed into a gently sloping shape by etching. Therefore, even if the insulating film between the electrode interconnection portion and the upper electrode interconnection portion is formed to be thin, it has a predetermined thickness at the position of the intersection between the electrode interconnection portions, so that no short-circuiting occurs between the upper layer of electrode interconnection portion and the lower layer of electrode interconnection portion. Moreover, at the position at which the upper layer of electrode interconnection portion intersects with the lower layer of electrode interconnection portion, the lower layer portion protrudes at a comparatively smooth inclination, so that the upper layer of electrode interconnection portion suffers no problem of disconnection.

Accordingly, multi-layer interconnections of two layers, three layers or more layers can be easily and reliably made and, in particular, a multi-layer interconnection substrate having a high degree of integration, such as a semiconductor device, can be produced. The amount of side etching can be increased by adding a small amount (below 6 percent) of ammonium fluoride to the aforesaid liquid etchant of the mixed solution consisting of phosphoric acid, glacial acetic acid, nitric acid and water.

The present invention is also applicable to metals which are subject to anodic oxidation or thermal oxidation at a comparatively low temperature, such as titanium (Ti), tantalum (Ta), zirconium (Zr), hafnium (Hf) and molybdenum (Mo).

We claim:

1. A method of forming an electrode interconnection comprising the steps of:
    a. providing a base material;
    b. forming a first metal layer on the surface of said base material;
    c. oxidizing a thin surface region of said first metal layer, thereby forming a porous metallic oxide film;
    d. forming a masking layer on at least one selected area on the surface of said porous metallic oxide film;
    e. etching and removing those portions of said porous metallic oxide film and the unoxidized metal layer other than at the electrode interconnection portion, by applying to said masking layer and said porous metallic oxide film an etching solution which etches said porous metallic oxide film at a greater etching rate than the unoxidized metal layer therebeneath, said porous metallic oxide film being side-etched between said masking layer and said unoxidized metal layer, whereby the electrode interconnection portion is etched into a gradually sloping contour at the ends of its upper surface and the sides thereof corresponding to the side-etched portions of said porous metallic oxide film; and
    f. sequentially forming second, third and higher-order layers of electrode interconnection portions onto said electrode interconnection by removing said masking layer and the porous metallic oxide film remaining after step (e) for said first metal layer, providing a first insulator over said first metal layer and providing additional metal and insulator layers on said first insulator layer to overlie the first formed electrode interconnection.

2. A method according to claim 1, wherein said first metal layer is aluminum and said etchant is a mixed solution of $H_3PO_4$, $CH_3COOH$, $HNO_3$ and $H_2O$.

3. A method according to claim 2, wherein said solution further includes a prescribed amount of $NH_4F$.

4. A method according to claim 2, wherein said masking layer is a photoresist film.

5. A method according to claim 2, wherein the temperature of said etchant is between 20° and 60° C.

6. A method according to claim 5, wherein said etchant temperature is about 40° C.

7. A method according to claim 2, wherein said first insulator layer is a layer of silicon oxide and said additional metal layer is a layer of deposited aluminum.

8. A method according to claim 1, wherein said first metal layer is a metal selected from the group consisting of aluminum, titanium, tantalum, zirconium, hafnium, and molybdenum.

9. A method according to claim 2, wherein the ratio of the respective components of said etchant is preferably about 76:15:3:5 by volume.

10. A method according to claim 9, further including an amount of $NH_4F$ in said mixed solution with a volumetric ratio component of less than six.

* * * * *